United States Patent
Allman et al.

(10) Patent No.: US 6,341,056 B1
(45) Date of Patent: Jan. 22, 2002

(54) CAPACITOR WITH MULTIPLE-COMPONENT DIELECTRIC AND METHOD OF FABRICATING SAME

(75) Inventors: Derryl D. J. Allman, Camas, WA (US); Brian Bystedt, Colorado Springs, CO (US)

(73) Assignee: LSI Logic Corporation, Milpitas, CA (US)

(*) Notice: Subject to any disclaimer, the term of this patent is extended or adjusted under 35 U.S.C. 154(b) by 0 days.

(21) Appl. No.: 09/573,123

(22) Filed: May 17, 2000

(51) Int. Cl.⁷ .............................. H01G 4/20; H01G 4/06
(52) U.S. Cl. ................... 361/312; 361/313; 257/295; 257/532
(58) Field of Search .................... 361/311, 312, 361/313, 306.3, 321.2; 257/295, 296, 532, 303, 306, 310

(56) References Cited

U.S. PATENT DOCUMENTS

| | | | |
|---|---|---|---|
| 4,437,139 A | * | 3/1984 | Howard ...................... 361/313 |
| 4,912,535 A | | 3/1990 | Okumura |
| 5,095,346 A | | 3/1992 | Bae et al. |
| 5,101,251 A | | 3/1992 | Wakamiya et al. |
| 5,142,437 A | * | 8/1992 | Kammerdiner et al. .. 361/321.1 |
| 5,155,657 A | | 10/1992 | Oehrlein et al. |
| 5,187,637 A | * | 2/1993 | Embree ...................... 361/313 |
| 5,195,018 A | * | 3/1993 | Kwon et al. ................ 361/313 |
| 5,240,871 A | | 8/1993 | Doan et al. |
| 5,273,925 A | | 12/1993 | Yamanaka |
| 5,381,365 A | | 1/1995 | Ajika et al. |
| 5,394,000 A | | 2/1995 | Ellul et al. |
| 5,434,812 A | | 7/1995 | Tseng |
| 5,436,186 A | | 7/1995 | Hsue et al. |
| 5,451,551 A | | 9/1995 | Krishnan et al. |
| 5,494,854 A | | 2/1996 | Jain |
| 5,494,857 A | | 2/1996 | Cooperman et al. |
| 5,497,017 A | | 3/1996 | Gonzales |
| 5,605,857 A | | 2/1997 | Jost et al. |
| 5,654,581 A | | 8/1997 | Radosevich et al. |
| 5,702,990 A | | 12/1997 | Jost et al. |
| 5,708,303 A | | 1/1998 | Jeng |
| 5,736,457 A | | 4/1998 | Zhao |
| 5,739,579 A | | 4/1998 | Chiang et al. |

(List continued on next page.)

FOREIGN PATENT DOCUMENTS

| | | |
|---|---|---|
| JP | 60253265 | 12/1985 |
| JP | 63048856 | 3/1988 |
| JP | 63087761 | 4/1988 |

OTHER PUBLICATIONS

Arjun Kar–Roy, et al., High Density Metal Insulator Metal Capacitors Using PECVD Nitride for Mixed Signal and RF Circuits, 1999 IEEE, pp. 245–247.

Peter Van Zant, Microchip Fabrication—A Practical Guide to Semiconductor Processing, Third Edition, pp. 374 and 379, 1997.

*Primary Examiner*—Anthony Dinkins

(57) ABSTRACT

A capacitor has a pair of plates separated by a capacitor dielectric material which is formed of multiple separate layers of different dielectric materials having different electrical characteristics. The different electrical characteristics are represented by linearity curves that curve relatively oppositely with respect to one another. Combining the different dielectric materials and separate layers achieves selected electrical characteristics from the overall capacitor dielectric material. The capacitor dielectric material may be formed with a top layer, a middle layer and a bottom layer. The middle layer may be formed of relatively high leakage dielectric and/or relatively high dielectric constant material, and the top and bottom layers may be formed of barrier material which is substantially resistant to leakage current and which exhibits a relatively lower dielectric constant.

21 Claims, 4 Drawing Sheets

U.S. PATENT DOCUMENTS

| | | | |
|---|---|---|---|
| 5,742,471 A | * 4/1998 | Barbee, Jr. et al. ......... 361/312 |
| 5,747,382 A | 5/1998 | Huang et al. |
| 5,753,948 A | 5/1998 | Nguyen et al. |
| 5,767,541 A | 6/1998 | Hanagasaki |
| 5,846,876 A | 12/1998 | Bandyopadhyay et al. |
| 5,913,141 A | 6/1999 | Bothra |
| 5,915,203 A | 6/1999 | Sengupta et al. |
| 5,925,932 A | 7/1999 | Tran et al. |
| 5,926,359 A | 7/1999 | Greco et al. |
| 5,976,928 A | 11/1999 | Kirlin et al. |
| 5,981,374 A | 11/1999 | Dalal et al. |
| 6,025,226 A | 2/2000 | Gambino et al. |
| 6,057,571 A | 5/2000 | Miller et al. |
| 6,069,051 A | 5/2000 | Nguyen et al. |
| 6,081,021 A | 6/2000 | Gambino et al. |
| 6,100,155 A | 8/2000 | Hu |
| 6,180,976 B1 | 1/2001 | Roy |
| 6,197,650 B1 | 3/2001 | Wu |

* cited by examiner

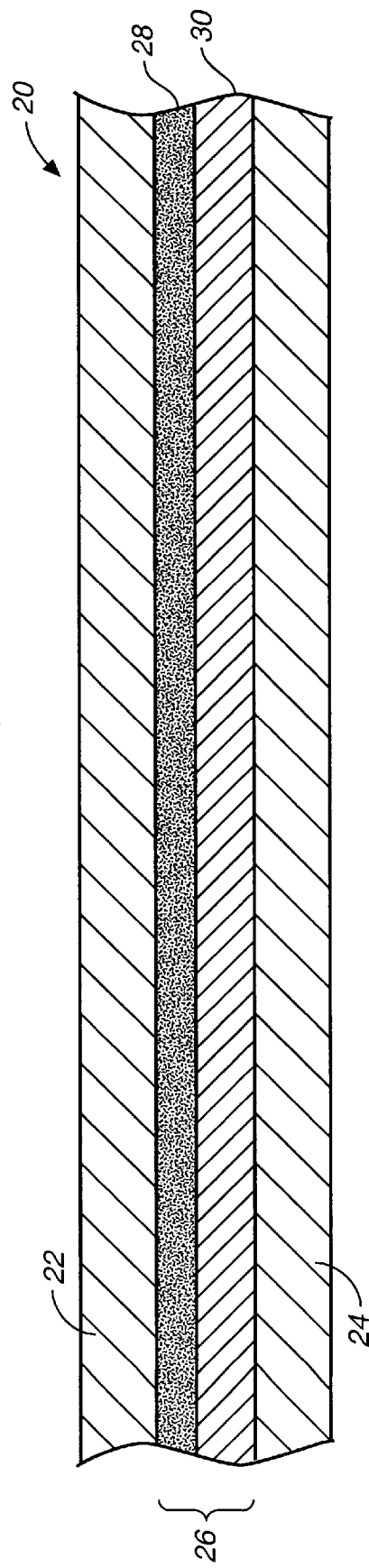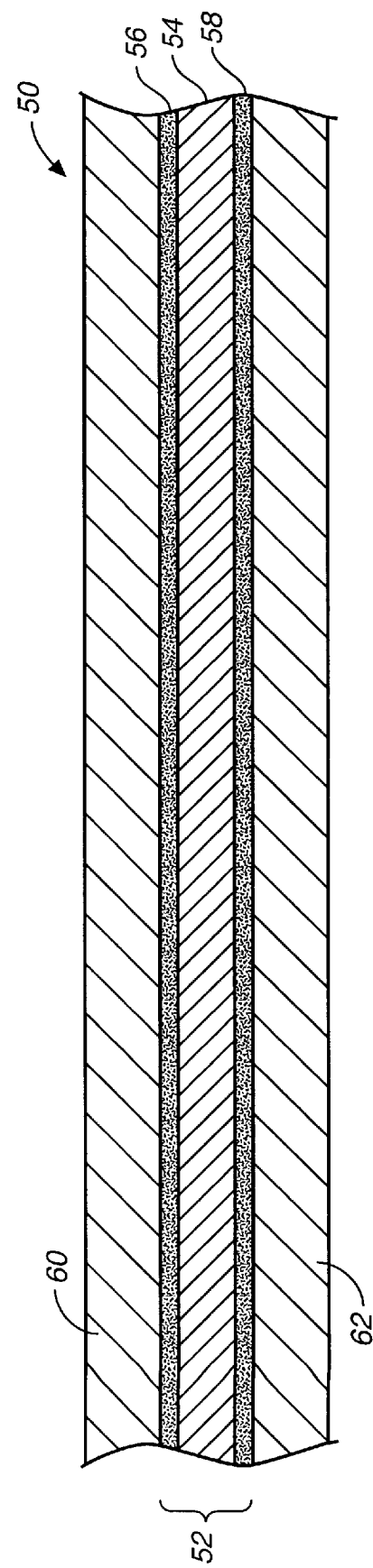

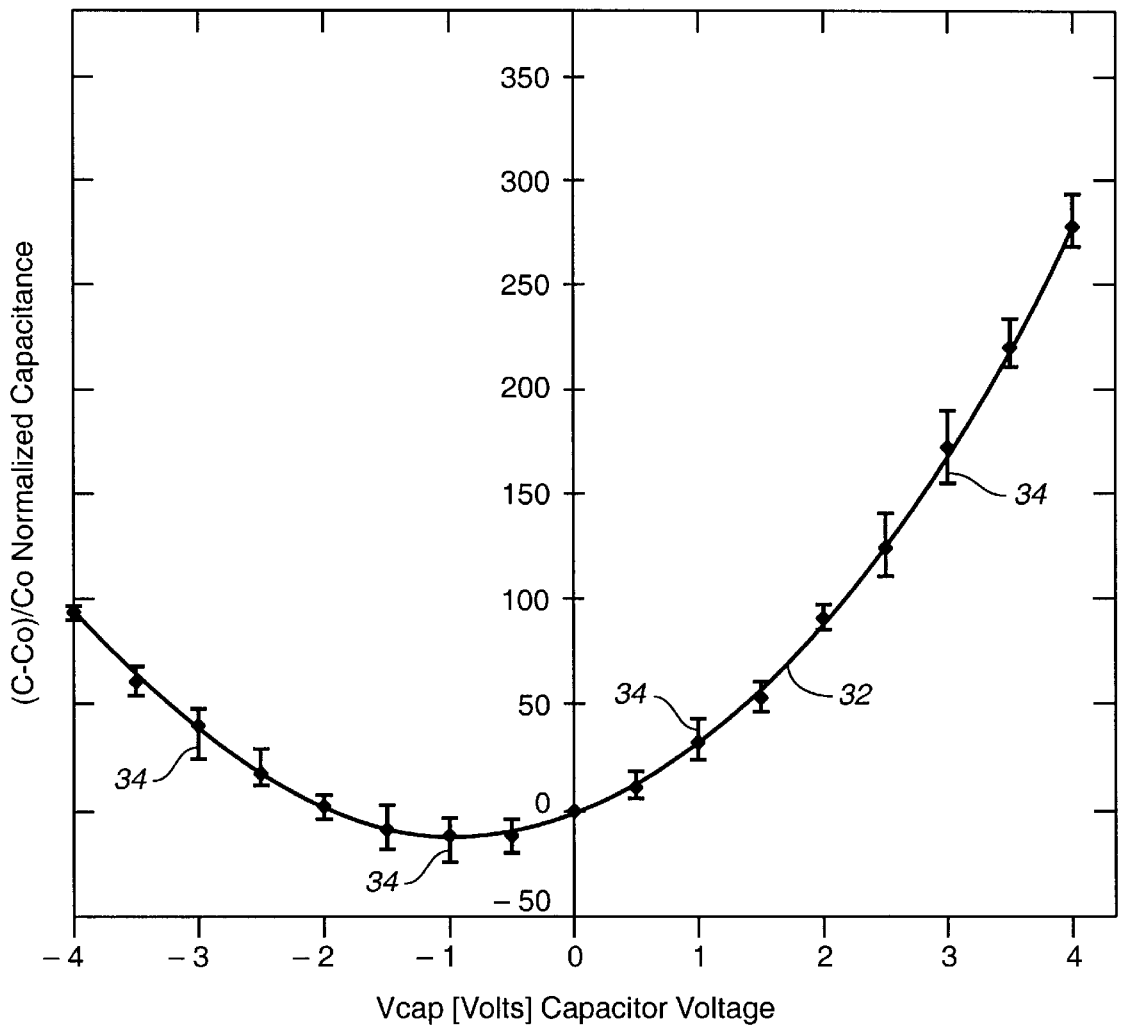
FIG._2

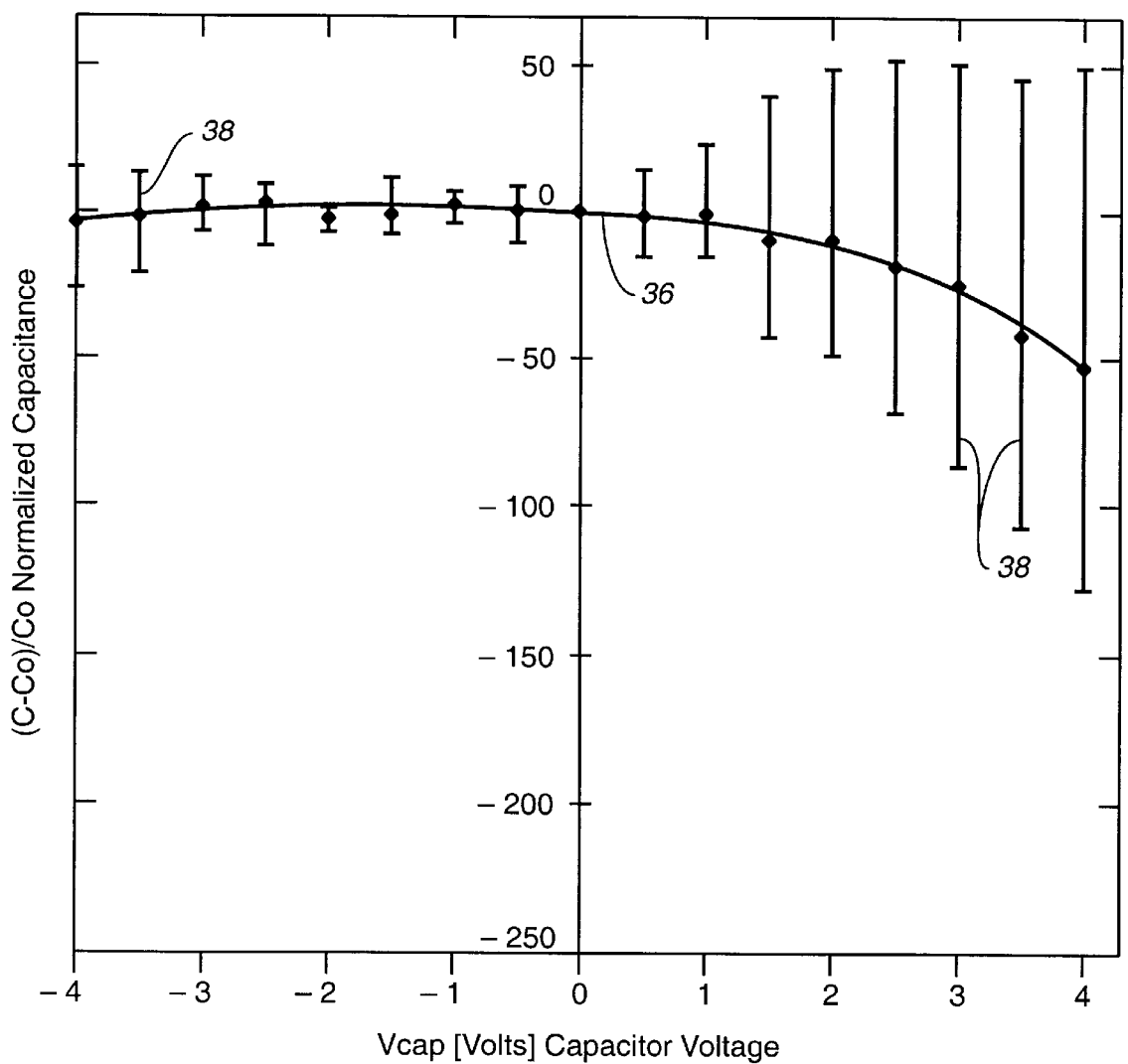
FIG._3

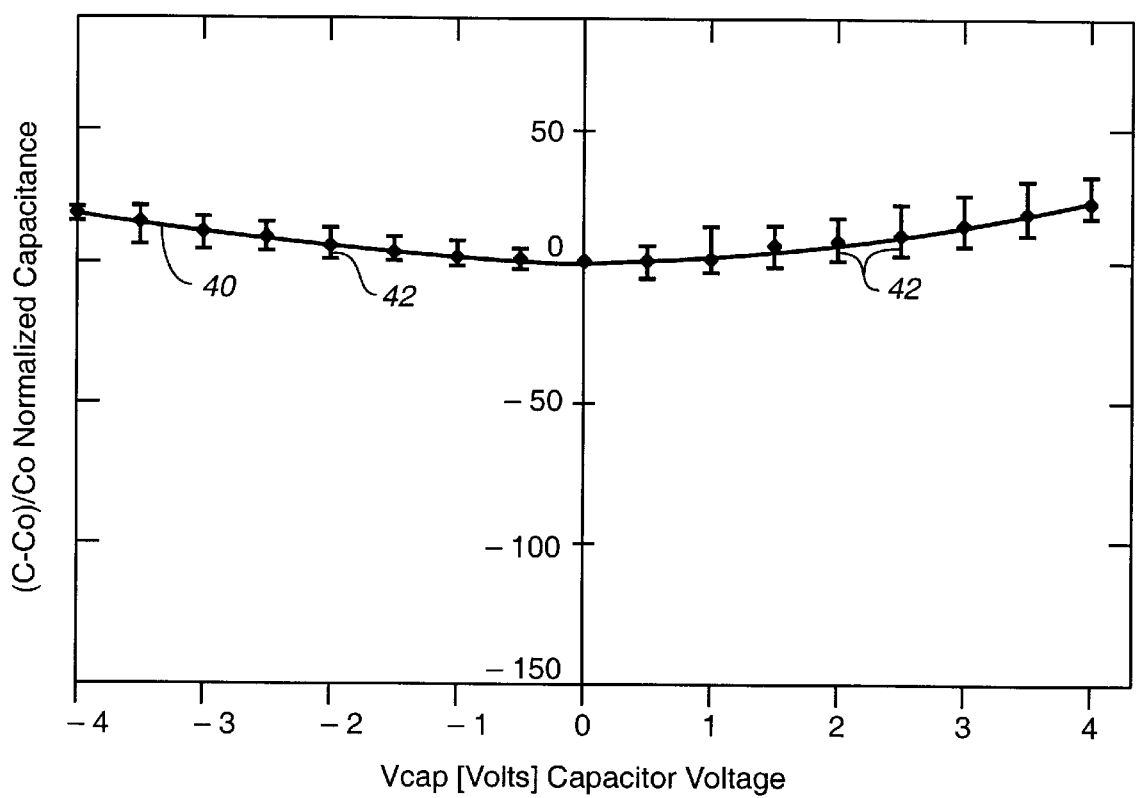
FIG._4

CAPACITOR WITH MULTIPLE-COMPONENT DIELECTRIC AND METHOD OF FABRICATING SAME

CROSS-REFERENCE TO RELATED INVENTIONS

This invention is related to the following inventions, all of which are assigned to the assignee of the present invention: High Aspect Ratio Metal-to-Metal Linear Capacitor for an Integrated Circuit, U.S. patent application Ser. No. 09/052,851, filed Mar. 31, 1998 now U.S. Pat. No. 6,057,571; Method of Electrically Connecting and Isolating Components with Vertical Elements Extending between Interconnect Layers in an Integrated Circuit, U.S. patent application Ser. No. 09/052,793, filed Mar. 31, 1998 now abandoned; Vertical Interdigitated Metal-Insulator-Metal Capacitor for an Integrated Circuit, U.S. patent application Ser. No. 09/219,655, filed Dec. 23, 1998; Method of Forming and Electrically Connecting a Vertical Interdigitated Metal-Insulator-Metal Capacitor Extending between Interconnect Layers in an Integrated Circuit, U.S. patent application Ser. No. 09/221,023, filed Dec. 23, 1998; Interconnect-Integrated Metal-Insulator-Metal Capacitor and Method of Fabricating Same, U.S. patent application Ser. No. 09/559,934, filed Apr. 27, 2000; Interconnect-Embedded Integrated Metal-Insulator-Metal Capacitor and Method of Fabricating Same, U.S. patent application Ser. No. 09/496,971, filed Feb. 2, 2000; Capacitor with Stoichiometrically Adjusted Dielectric and Method of Fabricating Same; U.S. patent application Ser. No. 09/573,137, filed concurrently herewith; and Encapsulated-Metal Vertical-Interdigitated Capacitor and Damascene Method of Manufacturing Same; U.S. patent application Ser. No. 09/525,489, filed Mar. 15, 2000. The disclosures of these aforementioned U.S. patent applications are hereby incorporated herein by this reference.

FIELD OF THE INVENTION

This invention relates to electrical capacitors. More particularly, the present invention relates to a new and improved capacitor having multiple different dielectric materials, preferably formed in layers or films, between its plates. The different types of multiple dielectric materials are selected to optimize or improve electrical or physical characteristics of the capacitor, such as its change-in-capacitance per change-in-voltage (dC/dV), its change-in-capacitance per change-in-temperature (dC/dT), its leakage current, or its dielectric constant. Optimizing these characteristics achieves more reliable and predictable functionality, as well as precise operating characteristics, thereby making the capacitor more suitable for both analog and digital circuit functions when incorporated within an integrated circuit (IC).

BACKGROUND OF THE INVENTION

Capacitors are commonly employed in ICs for a variety of purposes, such as to condition signals, to store electrical charge, to block DC voltage levels, and to stabilize power supplies. In memory ICs, a capacitor is used to hold enough charge to represent a detectable logic state.

Polysilicon is typically used to construct the plates of the capacitor in a substrate of the IC. The diffusion and doping characteristics of polysilicon result in variable capacitance characteristics, in which the capacitance value varies relative to the voltage level applied to the capacitor and the temperature experienced by the capacitor. Despite the variable characteristics of polysilicon capacitors, the capacitance variation is not of primary concern in digital memory ICs. Memory capacitors are required only to accept charge, to hold some or all of the charge for a finite time period and then discharge, all in a reliable manner. Furthermore, since polysilicon is also used to fabricate other components of the IC, such as transistors and conductors, the plates of the capacitors can be formed simultaneously with the other components of the IC.

In analog or mixed signal circuit applications, on the other hand, capacitors are frequently used as impedance elements whose response characteristic must be linear. If the impedance of the capacitor is not fixed and reliably ascertainable, the response of the capacitor will vary non-linearly, causing unacceptable variations in the performance of the mixed signal circuit.

Application specific integrated circuits (ASICs) sometimes combine analog circuitry with digital circuitry on the same substrate. In such applications, the fabrication of capacitors has become somewhat problematic. Polysilicon is a semiconductor, which is not the best material to use as an electrode to form a capacitor. A space charge layer forms in the doped polysilicon and adversely affects the capacitance vs. voltage response (linearity) and the frequency response of the capacitor. When a metal material is used for the electrode, however, no space charge layer exists.

Many contemporary ICs employ multiple layers of interconnects, as an adjunct of their miniaturization. Interconnects are layers of separate electrical conductors which are formed overlying the substrate and which electrically connect various functional components of the IC. Because of space and volume considerations in ICs, attention has been focused upon the effective use of the space between the interconnect layers. Normally the space between the interconnect layers is occupied by an insulating material, known as an intermetal dielectric (IMD). One effective use for the space between the interconnect layers is to form capacitors in this space using the interconnect layers. The previously referenced U.S. patent applications focus on different techniques for combining capacitors with the conductors of the interconnect layers to achieve desirable effects within the IC.

Because the conductors of the interconnect layers are of metal construction, the capacitors formed between the interconnect layers are preferably of a metal-insulator-metal (MIM) construction. A MIM capacitor has metal plates, usually formed on the metal conductors of the interconnect layers. The fourth and fifth above identified inventions describe techniques for forming the metal capacitor plates with the conductors of the interconnect layers. The additional benefit of MIM capacitors is that they possess a higher degree of linearity and an improved frequency response. Unlike polysilicon capacitors, MIM capacitors incorporated within the interconnect levels are unobtrusive to the underlying digital components or circuitry. The use of a MIM capacitor within the interconnect levels can also reduce the size of the overall IC structure because the digital circuitry exists under the capacitor, instead of beside it. Additionally, MIM capacitors are readily fabricated as part of the interconnect layers without a significant increase in the number of process steps or in the manufacturing costs. Connecting the MIM capacitors in the interconnect layers to the appropriate components of the IC is relatively easily accomplished by post-like or plug-like "via interconnects" that extend between the interconnect layers as needed.

However, even the more linear MIM capacitors are susceptible to non-linear performance under the influence of different electrical and physical conditions, and even relatively small deviations from the expected and desired performance may be sufficient to diminish the effective use of such capacitors in precise linear or analog circuits or in digital circuits. Furthermore, in some circumstances it is desirable to have a greater capacity than has been previously available as a result of limited space availability within the IC and limitations imposed by the integration of the capacitor in the IC. In still other cases it is desirable to avoid some of the previously-unsolved problems associated with the dielectric materials of capacitors.

It is with respect to these and other background considerations that the present invention has evolved.

SUMMARY OF THE INVENTION

The improvement of the invention relates to combining multiple different dielectric materials, preferably in separate layers or films, between the electrode plates of the capacitor to achieve improved or optimized electrical, physical and/or performance characteristics of a capacitor, preferably a capacitor integrated in an integrated circuit (IC). By combining different dielectric materials, the undesirable electrical characteristics of the capacitor may be minimized or eliminated, the physical characteristics of the capacitor may be enhanced or improved, previously-existing problems of integrating high dielectric constant dielectric materials in capacitors integrated in ICs may be eliminated, and a wider range of dielectric constants for the capacitor dielectric material are available.

Another improvement of the present invention relates to combining a layer or film of relatively leakage current-prone, high dielectric constant material with surrounding barrier layers or films of relatively low leakage current, low dielectric constant materials. The relatively high dielectric constant material achieves larger capacitance density, or the same capacitance with a thicker capacitor dielectric structure, while any excessive leakage current attributable to the high dielectric material is blocked as a result of the relatively low leakage barrier films which prohibit the flow of leakage current through the high dielectric material.

These and other improvements are achieved in a capacitor having a pair of plates separated by a capacitor dielectric material formed of multiple separate layers of different dielectric materials which have different linearity characteristics. The different dielectric materials preferably include two materials which have opposite non-linearity characteristics with respect to one another. The relative thickness of each of the two layers is related to the relative magnitude fo the linearity response of each material, preferably to obtain an overall substantially-linear electrical characteristic for the capacitor.

Still other improvements are obtained by a capacitor dielectric material which includes a top layer, a middle layer and a bottom layer. The middle layer may be formed of relatively high leakage dielectric material, and the top and bottom layers may be formed of barrier material which is substantially resistant to leakage current. In another embodiment, the middle layer is formed of material with a relatively higher dielectric constant than the dielectric constant of the material of the top and bottom layers. By enclosing the relatively high dielectric constant, relatively high leakage current material of the middle layer by barrier layers which prevent the leakage current from dissipating within the IC, a capacitor of substantially greater capacitance is obtained without the detrimental affects of high leakage current dielectric material.

Other improvements available from the present invention relate to a method of fabricating a capacitor. The method comprises forming capacitor dielectric material between the plates in multiple separate layers of different dielectric materials, and selecting the dielectric material of one of the layers to have different electrical characteristics than the dielectric material of another one of the layers. Preferably, the dielectric materials for two different layers are selected to have electrical characteristic curves that curve in opposition with respect to one another, and each of the layers is formed to a predetermined thickness related to the relative extent of the curvature of the electrical characteristic curve of each material.

The capacitor fabrication method may also involve forming a top layer, a middle layer and a bottom layer of the capacitor dielectric material, in which the middle layer is formed of substantially high leakage dielectric material and the top and bottom layers are formed of material which acts as a barrier or is substantially resistant to leakage current. In addition, or as an alternative, the middle layer is formed with a material having a substantially higher dielectric constant than the dielectric constant of the material of the top and bottom layers.

A more complete appreciation of the present invention and its scope, and the manner in which it achieves the above noted improvements, can be obtained by reference to the following detailed description of presently preferred embodiments of the invention taken in connection with the accompanying drawings, which are briefly summarized below, and the appended claims.

BRIEF DESCRIPTION OF THE DRAWINGS

FIG. 1 is a partial, vertical cross-sectional view of a capacitor having a multiple component capacitor dielectric material separating plates of the capacitor, which incorporates the present invention.

FIG. 2 is a normalized graph of exemplary change-in-capacitance per change-in-voltage (dC/dV) characteristics of one of the components of the dielectric material of the capacitor shown in FIG. 1.

FIG. 3 is a normalized graph of exemplary change-in-capacitance per change-in-voltage (dC/dV) characteristics of another one of the components of the dielectric material of the capacitor shown in FIG. 1.

FIG. 4 is a normalized graph of exemplary change-in-capacitance per change-in-voltage (dC/dV) characteristics of the capacitor shown in FIG. 1, by combining materials in the capacitor dielectric material having the characteristics shown in FIGS. 2 and 3.

FIG. 5 is a partial, vertical cross-sectional view of another embodiment of a capacitor having a multiple component capacitor dielectric material separating plates of the capacitor, which also incorporates the present invention.

DETAILED DESCRIPTION

A capacitor 20 which embodies the present invention is shown in FIG. 1. The capacitor 20 may be incorporated in an integrated circuit (IC) (not shown), either in a substrate of the IC or as part of the interconnect layers. The capacitor 20 has a pair of electrode plates 22 and 24, hereinafter referred to as the upper and lower plates, respectively. The plates 22 and 24 are separated by a capacitor dielectric material 26. The capacitor dielectric material 26 is formed by a plurality of different dielectric material components, preferably formed in at least two films or layers 28 and 30, hereinafter referred to as upper and lower films, respectively.

The materials of the films 28 and 30 are selected to achieve a desired effect in electrical, physical and capacitance value characteristics of the capacitor 20. The upper and lower plates 22 and 24 may be formed of a metal material, or in appropriate circumstances, a semiconductor material. In the case where the upper and lower plates 22 and 24 are formed substantially by metal material, such as copper or aluminum conductors of an interconnect layer, the electrical, physical and capacitance value characteristics of the capacitor 20 will be dictated primarily by the choice and content of the materials from which the films 28 and 30 are formed. In the case where the upper and lower plates 22 and 24 are formed of semiconductor or other non-principally metallic material, the material of the plates 22 and 24 should be selected to coordinate with the capacitor dielectric material 26 to achieve the electrical, physical and capacitance value characteristics by combining the plates 22 and 24 with the films 28 and 30 as the capacitor dielectric material 26.

One example of the electrical and performance characteristics of a capacitor which may be improved by the selection of two different dielectric materials for the films 28 and 30 is the linearity, or change-in-capacitance per change-in-voltage (dC/dV), characteristic of the capacitor. FIG. 2 illustrates the typical dC/dV characteristic of a capacitor having metal plates with a single dielectric material formed of silicon nitride. As shown in FIG. 2, a curved line 32 shows that the capacitance value varies according to the voltage applied across the capacitor plates. The fact that the line 32 is curved demonstrates that the response characteristics of the capacitor are not linear. In certain precision applications, enough nonlinearity of the line 32 may prevent the capacitor from functioning adequately within the circuit.

Vertical bars 34 at points along the curve 32 indicate statistics for the measurements made for capacitance at each voltage selection. Curve 32 shows the change in the mean in normalized capacitance within the voltage range of interest. The vertical bars 34 are generally indicative of a relatively small degree of expected variance of the dC/dV characteristics represented by the curve 32. Smaller vertical bars 34 indicate that the response characteristics of the capacitor dielectric material are fairly consistent along the curve 32, even though the curve 32 itself is nonlinear.

FIG. 3 illustrates the typical dC/dV characteristics of a capacitor having metal plates with a single dielectric material formed of silicon dioxide. In the situation illustrated in FIG. 3, curve 36 generally represents the change in capacitance relative to the change in voltage across the capacitor plates. Unlike curve 32 shown in FIG. 2, curve 36 shown in FIG. 3 is considerably more linear. Therefore, the response characteristics of a capacitor formed with silicon dioxide capacitor dielectric material should be more linear than the response characteristics of a capacitor formed with silicon nitride capacitor dielectric material (FIG. 2).

Vertical bars 38 at points on the curve 36 illustrate the expected variance in values. Some of vertical bars 38 show a considerable variation in value, indicating that the curve 36 is subject to a considerable degree of variability, particularly when the capacitor is subject to positive voltages. Thus, even with capacitor dielectric material made of silicon dioxide as shown in FIG. 3, there is a greater degree of variability in the curve 36, even though the curve 36 may be more linear than the curve 32 shown in FIG. 2.

Comparing FIGS. 2 and 3 with each other illustrates that the directions of curvature of the dC/dV electrical characteristics of the two materials, i.e. silicon nitride shown in FIG. 2 and silicon dioxide shown in FIG. 3, are generally opposite from one another, although the degree of curvature from curve 32 is considerably greater than the curvature of curve 36. Furthermore, the degree of variability of each of the points on the curve 36 at higher voltages is greater than the degree of variability of each of the points on the curve 32.

Combining the silicon nitride shown in FIG. 2 with the silicon dioxide shown in FIG. 3 as separate layers 28 and 30 in the capacitor 20 (FIG. 1) as the capacitor dielectric material 26 results in the ability to obtain a more linear dC/dV characteristic in a capacitor. Alternatively, it may be desirable to combine two or more different materials to induce and control a nonlinear or hysteresis effect. One of the layers 28 or 30 is formed by silicon dioxide while the other layer 30 or 28 is formed by silicon nitride. The more linear dC/dV characteristic is illustrated by the curve 40 shown in FIG. 4. In this case, the generally upward opening curvature of the silicon nitride dC/dV characteristic (32, FIG. 2) and the generally downward opening curvature of the silicon dioxide dC/dV characteristic (36, FIG. 3) have been counter balanced by one another, providing a more linear dC/dV response characteristic 40 than is possible by either the silicon nitride or the silicon dioxide by itself. Furthermore, the vertical bars 42 at representative data points of the curve 40 show a degree of variability which is less than the degree of variability associated with the silicon dioxide (bars 34, FIG. 2), but not significantly greater than the degree of variability shown by the silicon nitride (bars 38, FIG. 3).

In general, the amount of improvement or optimization to be obtained by combining two different materials as the capacitor dielectric material will be determined by the relative ratios of those materials. Generally, the overall effect is achieved in linear proportion to the amount or thickness of the individual films of the different materials combined to form the capacitor dielectric material. In other words, the degree of effect achieved in the end-resultant capacitor dielectric material will depend upon the extent of the individual effects by each of the component materials and their relative proportion in the capacitor dielectric material. The relative proportion of the materials is established by the thickness of each film. Furthermore, the relative proportion is determined by taking into account both the individual effect of each component and its relative influence on the proportion, as represented by the degree of curvature of its electrical characteristic. As an example of the relative degree of curvature of the electrical characteristic, the extent of the downward opening curvature of the silicon dioxide shown in FIG. 3 is less than the extent of the upper opening curvature of the silicon nitride shown in FIG. 2. Therefore, it would be necessary to include more silicon dioxide in the capacitor dielectric material than silicon nitride in order to form a substantially linear dV/dT characteristic.

Another example of an electrical characteristic which may be modified by the selection and relative proportion of different dielectric materials formed in separate films 28 and 30 as the capacitor dielectric material 26 is a change-in-capacitance per change-in-temperature (dC/dT) characteristic. Although not shown, dC/dT characteristics for different dielectric materials have different curves represented by different slopes. Depending upon the effect desired, the separate dielectric materials in the films 28 and 30 would be selected and proportioned in amount to achieve the desired effect. Furthermore, refinements to the proportioning of the different materials in the capacitor dielectric material itself may result in improvements or optimizations of multiple characteristics simultaneously, such as both the dC/dV and dC/dT characteristics.

The two films 28 and 30 may also be selected to obtain changes in the dielectric constant of the capacitor dielectric material. For example, the dielectric constant of silicon dioxide is approximately 3.9 to 4.0, while the dielectric constant of silicon nitride is approximately 6.0. Combining these two materials as the capacitor dielectric material will result in a dielectric constant between the two values of each material by itself. The change in the dielectric constant for the overall capacitor dielectric material will depend upon the initial dielectric constants of the materials of the two films 28 and 30, and their relative proportion.

The physical characteristics of the capacitor dielectric material may also be modified by using multiple films of different dielectric materials. A capacitor 50, shown in FIG. 5, uses a capacitor dielectric material 52 formed by three separate films 54, 56 and 58. The capacitor dielectric material 52 is formed by the three films 54, 56 and 58 located between plates 60 and 62 of the capacitor 50. The capacitor dielectric material 52 may be formed from any number of separate films or layers of different or alternating materials in the films or layers.

The electrical and the physical characteristics of the capacitor 50 may be adjusted by incorporating a very high dielectric constant material as the middle film 54, and adjoining or surrounding the middle film 54 by leakage-current barrier films 56 and 58. Very high dielectric constant materials, although potentially desirable as capacitor dielectric materials, are generally considered unsuitable for use as capacitor dielectric materials because of their characteristic relatively high leakage currents. Although a high dielectric constant material which also exhibits high leakage current characteristics may be used as a capacitor dielectric material between plates of a capacitor, some amount of the charge attempted to be stored by the capacitor will pass through the high dielectric constant material between the capacitor plates, as a result of the high leakage current characteristics of the dielectric material when a voltage is applied between plates. The relatively high leakage current characteristics thereby diminish the effectiveness of the capacitor.

The films used in the top and bottom layers 56 and 58 will typically have a much lower dielectric constant but will have high resistance to leakage current, as is the case of silicon nitride. By surrounding the middle film 54 by the leakage current resistant films 56 and 58, the undesirable high leakage current characteristics of the middle film 54 are avoided. The barrier films 56 and 58 prevent current flow from the high dielectric constant middle film 54, because the barrier films 56 and 58 isolate the middle film 54 and prevent leakage current from flowing between plates 60 and 62. The relatively high dielectric constant and the low leakage current characteristics obtained from the combination of films 54, 56 and 58 contribute significantly to the overall effective dielectric constant of the capacitor dielectric material 52, thereby substantially increasing the capacitance of the capacitor 50.

The use of three films 54, 56 and 58 to achieve a relatively high overall dielectric constant for the capacitor 50, while avoiding the problem of excessive leakage current is a substantial advantage and improvement. High dielectric constant materials can be incorporated in a capacitor integrated in an IC, while still avoiding undesirably high leakage currents. The construction of the capacitor 50 shown in FIG. 5, using the barrier layers 56 and 58 to surround the high leakage current, high dielectric constant material 54, makes them particularly suitable for use as dielectric materials in capacitors used in ICs. The relatively high overall dielectric constant of the capacitor allows the size of the capacitor to be reduced, because its capacitance is directly related to the dielectric constant. Because size and volume considerations in ICs are critical, reducing the physical size of the capacitors reduces the amount of space consumed by the capacitor, thus making other space available for functional components.

Examples of high dielectric constant material which are suitable for incorporation in capacitors in ICs include, silicon oxide, tantalum pentoxide oxide, piezoelectric materials, oxynitrided films, Indium tin oxide, and organic metals. The dielectric constants of these materials are relatively high, for example in excess of approximately 15. Examples of materials for the barrier films 56 and 58 which prevent the high leakage current from the middle film 54 include silicon nitride. Silicon nitride is a dense film that is very stable. Ionic and other species will not pass through silicon nitride, making it an effective barrier material. The dielectric constant of silicon nitride, although not high, is significant enough to contribute to the overall capacitor dielectric constant. The barrier films 54 and 58 do not need to be of the same material, so long as each material itself is a sufficient barrier material to leakage current.

By incorporating two or more different dielectric materials as separate films for the overall capacitor dielectric material, various improvements and optimizations in the electrical, physical and functional characteristics of the capacitor are obtained. In addition, the size of the capacitor may be diminished without reducing the performance of the capacitor or its capacity. Advantages in the fabrication of an IC may also result, since the formation of the distinct films of capacitor dielectric material may be coordinated with the fabrication of other components of the IC. In general, a variety of improved capacitor characteristics may be achieved from the combination of the multiple different capacitor dielectric materials as separate films to form a single overall capacitor dielectric material.

Presently preferred embodiments of the invention and its improvements have been described with a degree of particularity. This description has been made by way of preferred example. It should be understood that the scope of the present invention is defined by the following claims, and should not be unnecessarily limited by the detailed description of the preferred embodiments set forth above.

The invention claimed is:

1. A capacitor having a pair of plates separated by a capacitor dielectric material formed of multiple separate layers of at least two different dielectric materials which have electrical characteristic curves that curve in opposite directions with respect to one another, and a relative thickness of each of the layers being related to a relative extent of a curvature of the electrical characteristic curve of each material.

2. A capacitor as defined in claim 1 wherein the electrical characteristic curves of the two dielectric materials are each nonlinear.

3. A capacitor as defined in claim 1 wherein each of the the at least two dielectric materials is formed in a separate layer.

4. A capacitor as defined in claim 1 wherein the relative thickness of each of the layers is selected to create an overall substantially-linear electrical characteristic of the capacitor dielectric material.

5. A capacitor as defined in claim 1 wherein the dielectric material of one layer is substantially silicon nitride and the dielectric material of another layer is substantially silicon dioxide.

6. A capacitor as defined in claim 1 wherein the capacitor dielectric material comprises a top layer, a middle layer and a bottom layer, the middle layer comprising material having a relatively higher dielectric constant, and the top and bottom layers comprising material having a relatively lower dielectric constant.

7. A capacitor as defined in claim 6 wherein the top and bottom layers comprise substantially the same material.

8. A capacitor as defined in claim 6 wherein the top and bottom layers comprise different material.

9. A capacitor as defined in claim 6 wherein the middle layer comprises substantially one of tantalum pentoxide, piezoelectric material, oxynitrided material, Indium tin oxide or metal organic oxides.

10. A capacitor as defined in claim 9 wherein at least one of the top and bottom layers comprises substantially silicon nitride.

11. A capacitor comprising a pair of plates separated by a capacitor dielectric material formed of multiple separate layers of different dielectric materials which have different electrical linearity characteristics, the capacitor dielectric material comprising a top layer, a middle layer and a bottom layer, the middle layer comprising a substantially high leakage dielectric material, and the top and bottom layers comprising barrier material which is substantially resistant to leakage current.

12. A capacitor as defined in claim 11 wherein the top and bottom layers adjoin the middle layer on opposite sides of the middle layer.

13. A capacitor as defined in claim 11 wherein the middle layer comprises a material with a substantially higher dielectric constant than the dielectric constant of the material of the top and bottom layers.

14. A method of fabricating a capacitor having a pair of plates separated by a capacitor dielectric material, comprising the steps of:

forming the capacitor dielectric material between the plates in multiple separate layers of different dielectric materials, the multiple separate layers including a top layer, a middle layer and a bottom layer;

selecting the dielectric material of one of the layers to have different electrical characteristics than the dielectric material of another one of the layers;

forming the middle layer of dielectric material having a substantially high leakage current electrical characteristic; and forming the top and bottom layers of dielectric material having an electrical characteristic of substantial resistance to leakage current.

15. A method as defined in claim 14 further comprising the step of:

selecting the material of the middle layer to have a substantially higher dielectric constant than a dielectric constant of the material of the top and bottom layers.

16. A method of fabricating a capacitor having a pair of plates separated by a capacitor dielectric material, comprising the steps of:

forming the capacitor dielectric material between the plates in multiple separate layers of different dielectric materials;

selecting the dielectric material of a first one of the layers to have a first electrical characteristic curve having a first curvature;

selecting the dielectric material of a second one of the layers to have a second electrical characteristic curve having a second curvature different from the first curvature; and forming the first and second layers to first and second predetermined thicknesses, respectively, related to a relative extent of the first and second curvatures, respectively.

17. A method as defined in claim 16 further comprising the step of:

selecting the dielectric materials for the first and second layers to have the first and second electrical characteristic curves curve in opposition with respect to one another.

18. A method as defined in claim 16 wherein the first and second electrical characteristic curves are nonlinear.

19. A method as defined in claim 16 further comprising the steps of:

forming the capacitor dielectric material to include a top layer, a middle layer and a bottom layer;

forming the middle layer of a relatively higher dielectric constant material; and forming the top and bottom layers of a relatively lower dielectric constant material.

20. A method as defined in claim 19 wherein the material of the middle layer comprises substantially one of tantalum pentoxide, piezoelectric material, oxynitrided material, Indium tin oxide or metal organicoxides.

21. A method as defined in claim 20 wherein at least one of the top and bottom layers comprises substantially silicon nitride.

* * * * *